(12) United States Patent
McBrearty et al.

(10) Patent No.: US 6,961,727 B2
(45) Date of Patent: Nov. 1, 2005

(54) METHOD OF AUTOMATICALLY GENERATING AND DISBANDING DATA MIRRORS ACCORDING TO WORKLOAD CONDITIONS

(75) Inventors: Gerald Francis McBrearty, Austin, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 571 days.

(21) Appl. No.: 09/810,025

(22) Filed: Mar. 15, 2001

(65) Prior Publication Data

US 2002/0133681 A1 Sep. 19, 2002

(51) Int. Cl.$^7$ ............................................. G06F 17/30
(52) U.S. Cl. ............................................. 707/10; 707/2
(58) Field of Search .......................... 707/2, 10, 203, 707/204, 205; 714/5, 7, 10; 710/15

(56) References Cited

U.S. PATENT DOCUMENTS

| | | | | |
|---|---|---|---|---|
| 5,423,046 A | * | 6/1995 | Nunnelley et al. | 713/330 |
| 5,900,007 A | * | 5/1999 | Nunnelley et al. | 711/4 |
| 6,111,584 A | * | 8/2000 | Murphy | 345/582 |
| 6,112,257 A | * | 8/2000 | Mason et al. | 710/18 |
| 6,170,037 B1 | * | 1/2001 | Blumenau | 711/114 |
| 6,314,478 B1 | * | 11/2001 | Etcheverry | 710/29 |
| 6,321,238 B1 | * | 11/2001 | Putzolu | 707/205 |
| 6,345,288 B1 | * | 2/2002 | Reed et al. | 709/201 |
| 6,457,139 B1 | * | 9/2002 | D'Errico et al. | 714/5 |

* cited by examiner

Primary Examiner—Frantz Coby
Assistant Examiner—Haythim Alaubaidi
(74) Attorney, Agent, or Firm—Duke W. Yee; Volel Emile; Stephen R. Tkacs

(57) ABSTRACT

A method of automatically generating and decommissioning mirrors of data contained in physical storage volumes in computer system is disclosed. Physical storage volumes and portions of volumes are monitored to collect usage statistics. Those usage statistics are then used to determine whether to mirror the volume or volume portion for greater efficiency. Likewise, the usage statistics are used to determine when mirrors already generated should be decommissioned due to lack of usage.

22 Claims, 4 Drawing Sheets

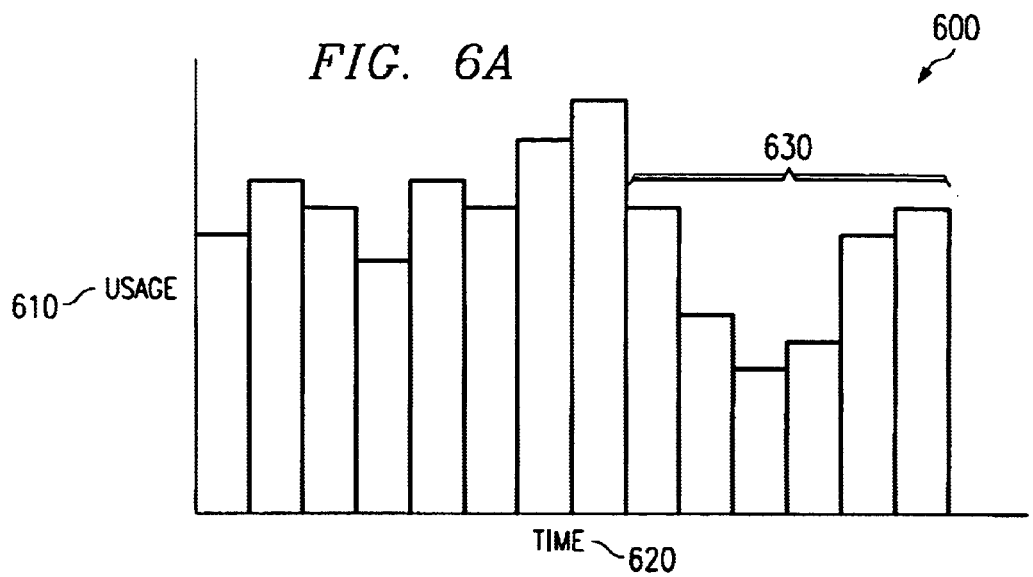

```
if (already mirrored) {  ─642
    num_reads = read_stats ( ) ;   ⎫
    num_writes = write_stats ( ) ; ⎬ 644
                                   ⎭
    if ( (num_reads < HEAVY_READ_THRESHOLD) &&   ⎫
         (num_writes < HEAVY_WRITE_THRESHOLD) ) { ⎬ 646
                                                  ⎭ decommission_mirror ( ) ;  ─648
    } reset_read_count ( ) ;   ⎫
    reset_write_count ( ) ;  ⎬ 650
                             ⎭
}
else {  ─652
    num_reads = read_stats ( ) ;    ⎫
    num_writes = write_stats ( ) ;  ⎬ 654
                                    ⎭
    if ( (num_reads > HEAVY_READ_THRESHOLD) ||   ⎫
         (num_writes > HEAVY_WRITE_THRESHOLD) ) { ⎬ 656
                                                  ⎭ generate_mirror ( ) ;  ─658
    } reset_read_count ( ) ;   ⎫
    reset_write_count ( ) ;  ⎬ 660
                             ⎭
}
```

METHOD OF AUTOMATICALLY GENERATING AND DISBANDING DATA MIRRORS ACCORDING TO WORKLOAD CONDITIONS

BACKGROUND OF THE INVENTION

1. Technical Field

The present invention relates generally to a method of alleviating the workload of storage devices in a computer system through mirroring. More specifically, the present invention is directed toward a method of automatically establishing and decommissioning mirrors of data storage volumes in response to current storage system workloads.

2. Description of Related Art

In the past, large computer systems were mainly tools for calculation. With the growth of the Internet, the role of large-scale computer systems has shifted from calculation to data storage. Modern large-scale computer systems are primarily used as servers, machines that provide services (like data storage and retrieval) to a network of smaller-scale client computer systems. As a result, today's servers must be capable of quickly handling a large volume of accesses to mass data storage devices, such as disk drives, to store or retrieve data.

The efficiency of a server in storing and retrieving data for clients is limited in large degree to the physical technology used for the server's data storage. Disk drives, for instance, use a moving magnetic head to write or read concentric circular tracks on a rotating magnetic disk. The speed at which a disk drive is able to process a read or write operation is limited by the drive's mechanical seek time and rotational latency. The seek time is the time it takes for the disk drive's head to move from one track to another, and the rotational latency is the time it takes for the rotating magnetic disk to rotate to the proper position for reading or writing the information.

When a computer system has many requests to store or retrieve data from a mass storage device, the requests may be delayed considerably in execution as one operation must be completed mechanically before another may be processed. One way of alleviating this inefficiency is to use a mirror.

A mirror is a duplicate on one or more physical storage devices of some or all of the contents of another physical storage device or devices. When a mirror is employed in a computer system, requests to access the mirrored data may be processed by either the original storage device storing the data or by the mirror. By distributing the requests over two or more sets of physical storage devices, the workload of any one physical storage device is diminished.

There are a few problems with mirroring that reduce its effectiveness as an efficiency enhancement technique, however. One is that it is not always clear to a system administrator or user of a computer system which volumes or portions of volumes should be mirrored for optimal efficiency. Another is that because certain items of data may be accessed more heavily at some times than others, the optimal mirroring scheme may change from time to time. Keeping up with changing usage requirements is inconvenient at best. What is needed is a mirroring scheme that allows for optimal mirroring of data under changing circumstances.

SUMMARY OF THE INVENTION

The present invention provides a method of performing optimal mirroring of data under changing workload conditions. To achieve this, the present invention collects and monitors usage statistics about storage volumes and portions of storage volumes. When usage of a particular volume or portion exceeds a certain level, a mirror of the volume or portion is generated. When usage of a mirrored volume or portion drops below a certain level, the mirror is decommissioned to free storage space for the creation of new mirrors.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of illustrative embodiments when read in conjunction with the accompanying drawings, wherein:

FIG. 6A is a graph depicting a period of low resource usage in a computer system in accordance with an embodiment of the present invention;

FIG. 6B is a pseudocode representation of a subroutine to handle the mirroring of a single volume in a computer system in accordance with an embodiment of the present invention;

DETAILED DESCRIPTION OF PREFERRED EMBODIMENTS

Figure 1:
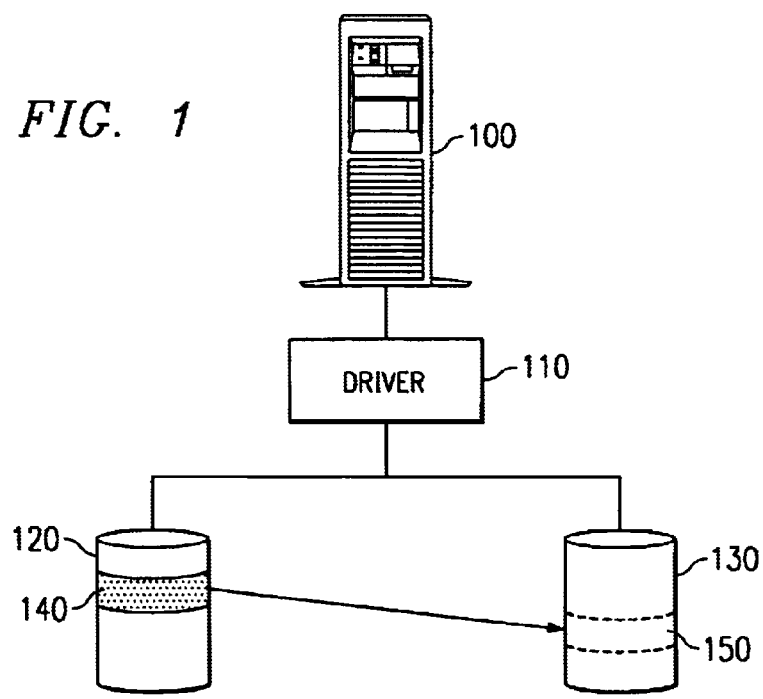
FIG. 1 is a diagram depicting a basic overview of an embodiment of the present invention.

FIG. 1 is a diagram depicting the structure and operation of a preferred embodiment of the present invention. Central Processing Unit (CPU) 100 executes a software driver 110 to operate two storage volumes 120, 130. Storage volumes 120, 130 may be made up of disk storage, tape storage, or any other read/write storage medium. Moreover, storage volumes 120, 130 need not be physical devices; they may be "logical volumes." Logical volumes are portions of physical storage volumes that are treated by operating system software as if they were separate physical volumes.

Storage volume 120 contains a section of data 140 that is very frequently accessed (in other words, frequently read from or written to), called a "hot spot." Volume 120, because of the physical limitations of storage technology, can only process a finite number of requests from CPU 100 to access the data of volume 120 at any one time. When the actual number of requests from CPU 100 to volume 120 exceeds this number, the requests begin to accumulate and their processing is delayed.

To alleviate this situation, driver 110 first detects the existence of the hot spot, section 140. It does this by calculating one or more usage metrics associated with hot spot 140. Acceptable usage metrics include, but are not limited to number of reads in a given time period, number of write in a given time period, number of reads and writes in a given time period, and number of megabytes of data transferred in a given time period. A combination of usage metrics may be employed, as well, with some metrics carrying more weight than others. For instance, the number of reads in a given time period may be made to outweigh the number of writes in determining whether to mirror.

Also, usage metrics may be calculated with respect to entire volumes or to portions of volumes. A simple way of doing this is to construct a table that maps portions of volumes or entire volumes to usage metrics.

Driver 110 then automatically copies the information from section 140 to an area of unused storage space 150 on volume 130 to create a "mirror" of section 140. Such copying, which is directed by driver 110 may be performed by CPU 100 or by a separate controller device (not shown). Using a separate controller reduces the workload of CPU 100. Area 150 may either be an area specially reserved for use as a mirror, or it may be simply a block of unreserved empty space.

Once the data is copied, when CPU 100 requests that data from section 140 be read, driver 110 can retrieve the data from either section 140 or the mirror, section 150. By distributing requests between section 140 on volume 120 and section 150 on volume 130, driver 110 can ensure that neither volume is overloaded with requests, and thus all requests will be processed in a timely fashion.

Figure 2:
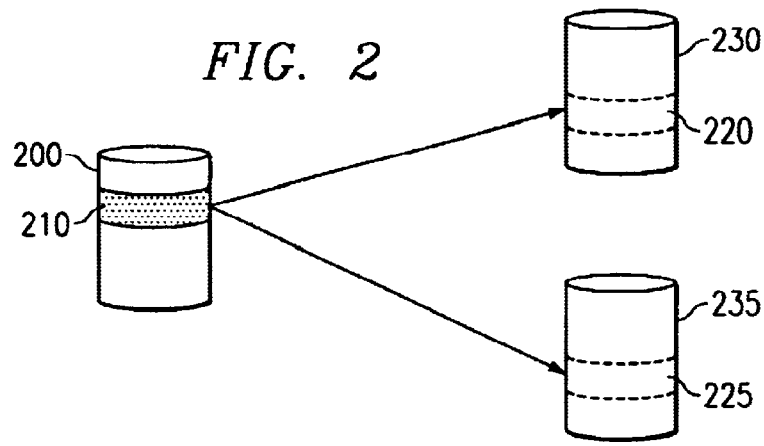
FIG. 2 is a diagram depicting the use of multiple physical volumes as a single mirror in an embodiment of the present invention.

FIG. 2 shows how a volume 200 with a hot spot 210 can be automatically mirrored using multiple areas of empty space 220, 225, in an embodiment of the present invention. Mirroring hot spot 210 in this way allows any available storage space on any physical volumes within the computer system to be used for generating mirrors, thus maximizing storage efficiency. Note that while in FIG. 2, area 220 and area 225 are on separate physical volumes 230, 235, separate areas may exist on the same volume as well.

Figure 3:
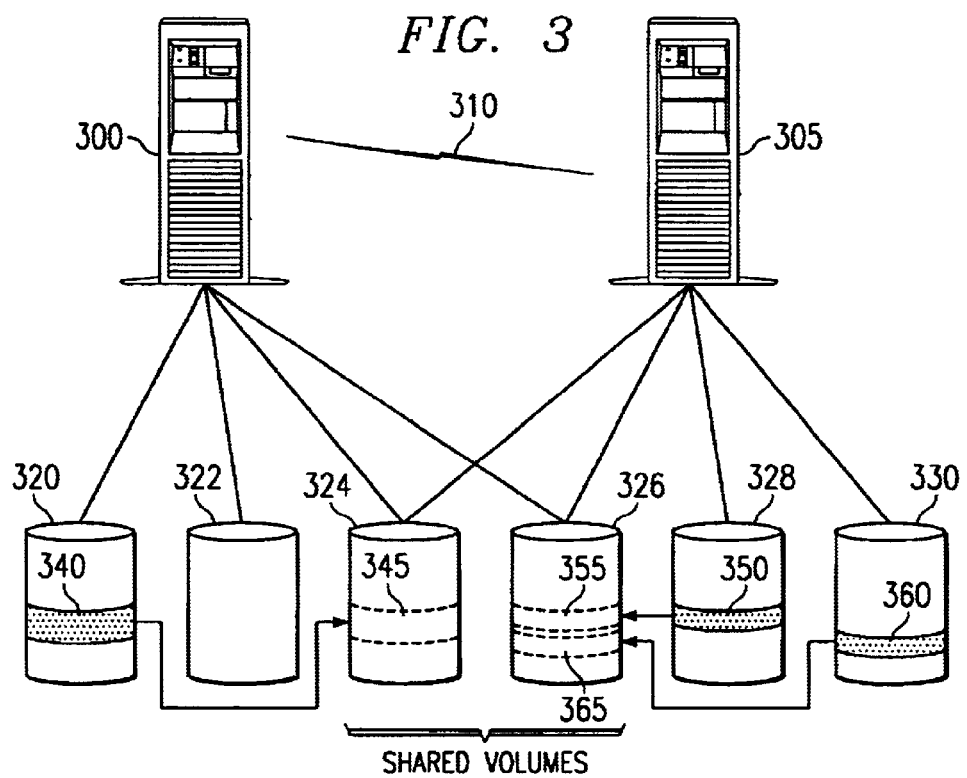
FIG. 3 is a diagram depicting the use of volumes shared by two central processing units for generating mirrors in an embodiment of the present invention.

FIG. 3 demonstrates how volumes used for mirroring may be shared between two CPUs 300, 305 in communication 310 with one another, in an embodiment of the present invention. In FIG. 3, CPU 300 has access to volumes 320, 322, 324, and 326, while CPU 305 has access to volumes 324, 326, 328, and 330. Volumes 324 and 326 are shared between CPU 300 and CPU 305. Hot spot 340 is mirrored in area 345 of volume 324 and hot spots 350 and 360 are mirrored in areas 355 and 365 of volume 326, respectively.

This shared volume arrangement is common where the shared volumes are used as "hot spares." Hot spares are storage volumes that are reserved for use when a failure in another storage volume occurs. When a failure occurs, a hot spare is substituted for the failing device. Using hot spare volumes for automatic mirroring, in accordance with the present invention, can be advantageous, particularly under circumstances that necessitate the mirroring of an entire volume of information. Since hot spare volumes are usually kept empty, it is usually convenient to mirror information to a hot spare. When a hot spare volume being used as a mirror becomes needed to replace a failed volume, the mirror can be easily decommissioned.

Figure 4:
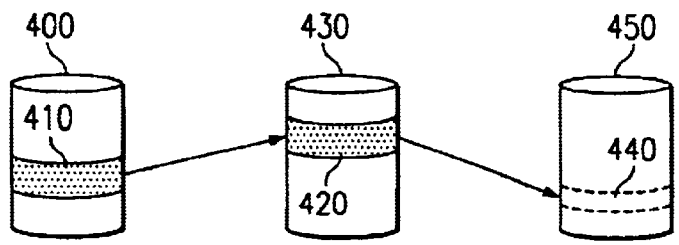
FIG. 4 is a diagram depicting the creation of multiple mirrors by generating mirrors of mirrors in an embodiment of the present invention.

FIG. 4 depicts multiple mirroring, mirroring of mirrors, in accordance with an embodiment of the present invention. Volume 400 contains a hot spot 410 that is mirrored in area 420 on volume 430. If usage becomes exceptionally high, however, area 420 will itself become a hot spot. When this occurs, area 420 can be mirrored to an empty area 440 on another volume 450. This process of generating mirrors of mirrors can continue until usage levels on a per-volume basis reach a manageable level.

Figure 5A:
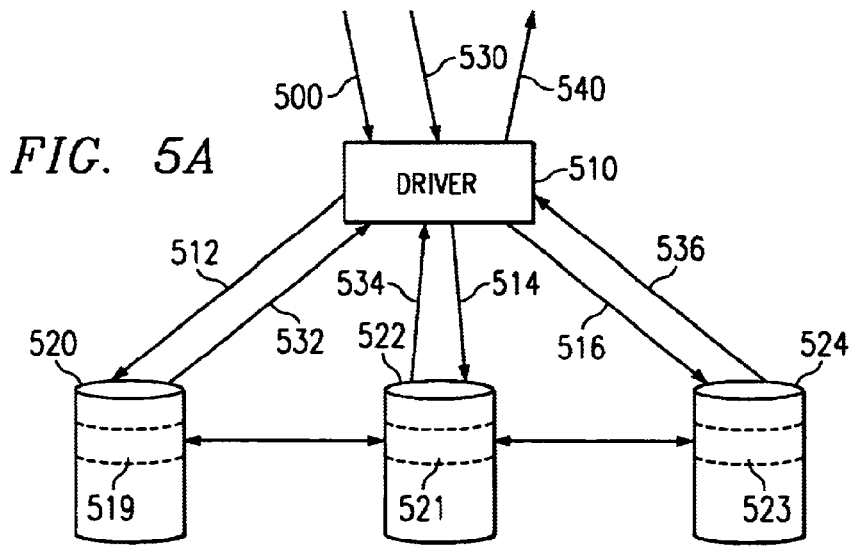
FIG. 5A is a diagram depicting the process of writing and reading an item of data to a volume and mirrors in an embodiment of the present invention.

FIG. 5A demonstrates a process of writing information to a volume 520 and associated mirrors 522 and 524. A request to write data 500 from a CPU (not shown) is presented to software driver 510. Driver 510 writes (512, 514, 516) the data to areas 519, 521, and 523 on volumes 520, 522, and 524, respectively.

When a request to read data 530 is received by driver 510, driver 510 will process the request using one of volumes 520, 522, 524. Because each of volumes 520, 522, 524 may be in a different stage of writing the data from write request 500, read request 530 will not be processed until driver 510 receives confirmations 532, 534, 536 from each of volumes 520, 522, 524 confirming that the data from write request 500 has been written. Once confirmations 532, 534, 536 have been received by driver 510, then read request 530 is processed and a result 540 returned to the CPU.

Figure 5B:
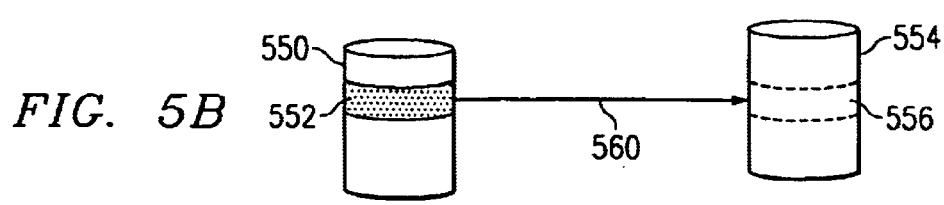
FIG. 5B is a diagram depicting the process of decommissioning a mirror in an embodiment of the present invention.

FIG. 5B demonstrates a process of decommissioning a mirrored volume in an embodiment of the present invention. Volume 550 contains a hot spot 552 that is mirrored on volume 554 in mirror area 556. If the usage of areas 552 and 556 drops, such that having a mirror to reduce usage loads on volumes 554 and 556 is no longer warranted, mirror area 556 can be disabled and its storage space freed. The storage space in mirror area 556 may then be used for generating a new mirror or for any other storage purpose.

Although generating a mirror can increase the efficiency of a storage system, the process of generating the mirror is a resource-intensive task. It is desirable, then, to schedule automatic mirroring of a volume during times of less resource usage. FIG. 6A provides a graph 600 of computer system resource usage 610 against time 620. Resource usage, as used here, may include storage volume usage, CPU usage, or any other suitable metric for describing the workload of the computer system. Period 630, a period of low resource usage, is thus an example of an optimal time for generating a mirror FIG. 6B provides an example of a listing 640 in a C-like pseudocode of a subroutine to address a single portion of data, written in accordance with a preferred embodiment of the invention. Those skilled in the art will appreciate that a software implementation of the present invention is not limited to the use of the C language but may be implemented in any of a variety of computer languages, including but not limited to C++, Forth, Lisp, Scheme, Python, Perl, and Assembly Languages of all kinds. It is also to be emphasized that this listing is merely an example of one possible implementation of the present invention, included to clarify the basic concepts underlying the invention by providing them in a more concrete form. FIG. 6B should not be interpreted as limiting the invention to a particular software implementation.

In listing 640, on line 642, if the data portion is already mirrored, then the numbers of reads and writes performed on the data portion since the last invocation of the subroutine is retrieved (lines 644). On line 646, if neither the number of reads nor the number of writes exceeds one or more predetermined thresholds, the mirror is decommissioned (line 648) to free the space. Then the numbers of reads and writes are reset to zero (line 650).

If the data portion is not mirrored (line 652), the numbers of reads and writes since the last invocation of the subroutine are retrieved (lines 654). If either the number of reads or the number of writes exceeds predetermined thresholds (line 656), then a mirror of the data portion is generated (line 658). Finally, the numbers of reads and writes are reset to zero (lines 660).

Figure 7:
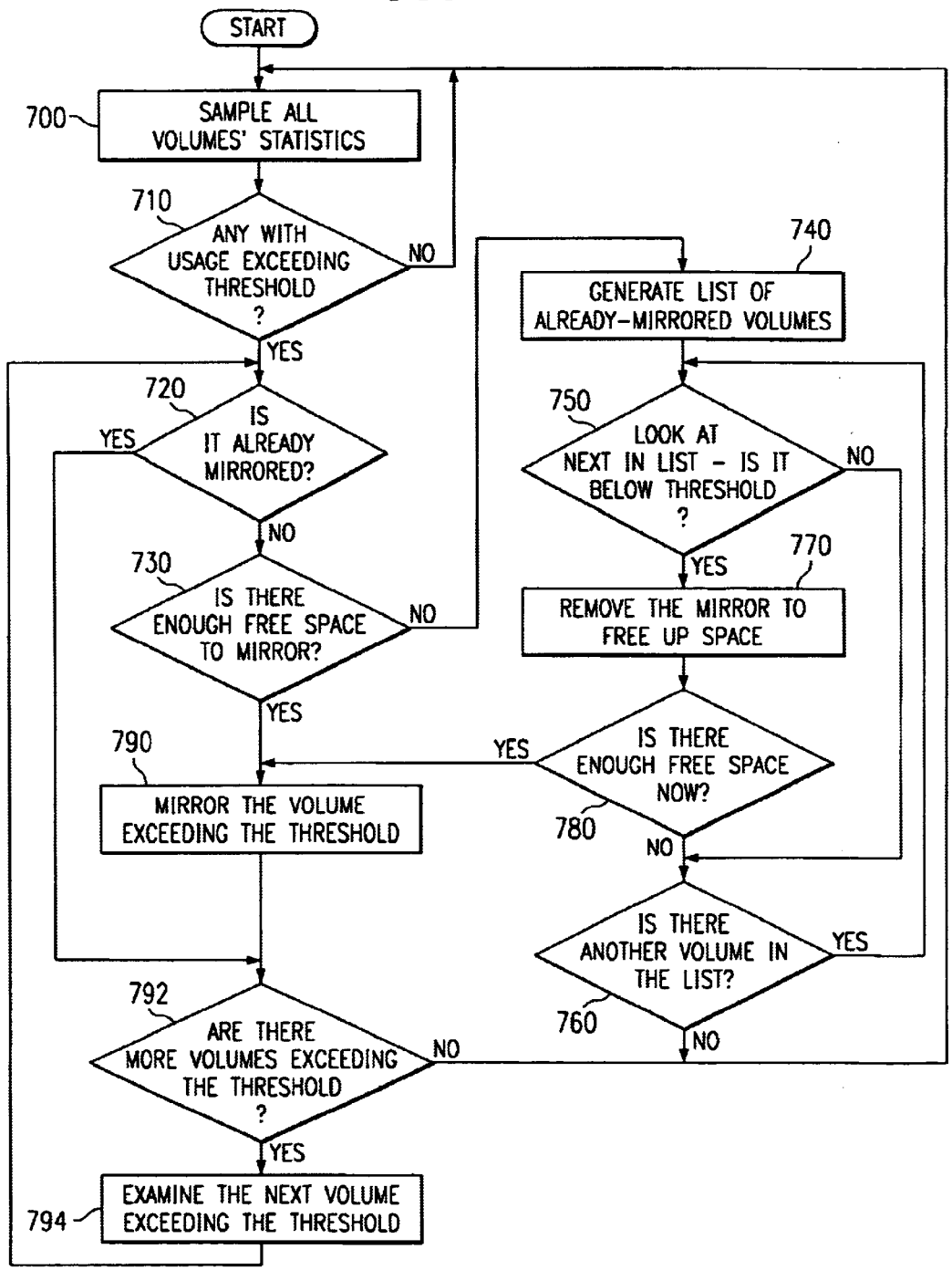
FIG. 7 is a flowchart representation of a process of generating and decommissioning mirrors in accordance with an embodiment of the present invention.

FIG. 7 is a flowchart representation of the operation of a preferred embodiment of the present invention. First, the usage statistics of all volumes are collected (step 700). If there is a volume with usage exceeding a threshold (step 710), a determination is made as to whether the volume (or portion of a volume) has already been mirrored (step 720).

If the volume has not been mirrored, a determination is made as to whether there is enough free space to generate a mirror (step 730). If not, then a list is generated of already-mirrored volumes (step 740). In steps 750 and 760, the already-mirrored volumes are iterated through to find one with usage below threshold. If there are none below threshold, operation returns to the beginning (step 700).

If a below-threshold volume is found, the mirror associated with that volume is decommissioned to free storage space (step 770). If insufficient space has been freed to generate a new mirror after decommissioning the mirror (step 780), another below-threshold mirrored volume is searched for (step 760). If there is enough space to generate a new mirror (step 780), then a mirror of the threshold-exceeding volume is generated (step 790). If there are any more volumes (or portions of volumes) exceeding the threshold (step 792), the next volume exceeding the threshold is examined (step 794) and the mirroring process continues for that volume (step 720).

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for distributing a storage system workload in a data processing system having a plurality of storage volumes, comprising the steps of:

collecting usage statistics from the plurality of physical storage volumes;

analyzing the usage statistics to identify a hot spot on a first physical storage volume from the plurality of physical storage volumes;

copying data from the hot spot to at least one portion of unused storage space on at least one second physical storage volume to generate a mirror of the hot spot;

analyzing the usage statistics to identify an underutilized mirror stored in the plurality of physical storage volumes; and decommissioning the underutilized mirror to free space associated with the underutilized mirror.

2. The method of claim 1, further comprising the steps of:

receiving a request to read data from the hot spot; and responsive to receiving the request to read, reading the data from one of the hot spot and the mirror.

3. The method of claim 2, further comprising the steps of:

receiving a request to write the data to the hot spot;

responsive to receiving the request to write, writing the data to the hot spot and to the mirror; and disallowing execution of the reading step until the writing step has been fully completed.

4. The method of claim 1, further comprising the steps of:

receiving a request to write the data to the hot spot;

responsive to receiving the request to write, writing the data to the hot spot and to the mirror.

5. The method of claim 1, wherein the at least one second physical storage volume includes at least one shared volume, which is shared between the data processing system and at least one second data processing system.

6. The method of claim 1, wherein the at least one second physical storage volume includes at least one hot spare volume, and wherein the at least one hot spare volume is reserved to be used as a substitute device when one of the plurality of physical storage volumes fails.

7. The method of claim 6, further comprising the step of:

responsive to a failure of a third physical storage volume from the plurality of physical storage volumes, decommissioning the mirror.

8. The method of claim 1, wherein the hot spot is a mirror of a second hot spot.

9. The method of claim 1, further comprising the steps of:

identifying a period of low resource usage within the data processing system; and scheduling the copying step to be performed during the period.

10. The method of claim 1, wherein the hot spot is identified by calculating at least one usage metric and comparing the at least one usage metric to at least one threshold value.

11. A computer program product, in a computer-readable medium, for distributing a storage system workload in a data processing system having a plurality of storage volumes, comprising instructions for:

collecting usage statistics from the plurality of physical storage volumes;

analyzing the usage statistics to identify a hot spot on a first physical storage volume from the plurality of physical storage volumes;

copying data from the hot spot to at least one portion of unused storage space on at least one second physical storage volume to generate a mirror of the hot spot;

analyzing the usage statistics to identify an underutilized mirror stored in the plurality of physical storage volumes; and decommissioning the underutilized mirror to free space associated with the underutilized mirror.

12. The computer program product of claim 11, further comprising instructions for:

receiving a request to read data from the hot spot; and responsive to the receiving the request to read, reading the data from one of the hot spot and the mirror.

13. The computer program product of claim 12, further comprising instructions for:

receiving a request to write the data to the hot spot;

responsive to receiving the request to write, writing the data to the hot spot and to the mirror; and disallowing execution of the reading step until the writing step has been fully completed.

14. The computer program product of claim 11, comprising instructions for:

receiving a request to write the data to the hot spot;

responsive to receiving the request to write, writing the data to the hot spot and to the mirror.

15. The computer program product of claim 11, wherein the at least one second physical storage volume includes at least one shared volume, which is shared between the data processing system and at least one second data processing system.

16. The computer program product of claim 11, wherein the at least one second physical storage volume includes at least one hot spare volume, and wherein the at least one hot spare volume is reserved to be used as a substitute device when one of the plurality of physical storage volumes fails.

17. The computer program product of claim 16, further comprising instructions for:

responsive to a failure of a third physical storage volume from the plurality of physical storage volumes, decommissioning the mirror.

18. The computer program product of claim 11, wherein the hot spot is a mirror of a second hot spot.

19. The computer program product of claim 11, further comprising instructions for:

identifying a period of low resource usage within the data processing system; and scheduling the instructions for copying to be executed during the period.

20. The computer program product of claim 11, wherein the hot spot is identified by calculating at least one usage metric and comparing the at least one usage metric to at least one threshold value.

21. A system for distributing a storage system workload, comprising:

a central processing unit executing a software driver; and a plurality of physical storage volumes in communication with the central processing unit and controlled by the software driver, wherein the software driver collects usage statistics from the plurality of physical storage volumes, the software driver analyzes the usage statistics to find a hot spot on a first physical storage volume from the plurality of physical storage volumes, the software driver identifies at least one portion of unused storage space on at least one second physical storage volume from the plurality of physical storage volumes, and the software driver copies data from the hot spot to the at least one portion of unused storage space to generate a mirror of the hot spot, analyzes the usage statistics to identify an underutilized mirror stored in the plurality of physical storage volumes, and decommissions the underutilized mirror to free space associated with the underutilized mirror.

22. The system of claim 21, wherein the first physical storage volume is a disk drive.

* * * * *